Patented June 6, 1933

1,912,772

UNITED STATES PATENT OFFICE

PATTILLO HIGGINS, OF SAN ANTONIO, TEXAS

METHOD OF PRODUCING CLAY PRODUCTS

No Drawing.   Application filed October 6, 1930. Serial No. 486,766.

This invention relates to a novel method of producing clay products.

One object of the invention resides in the novel method, or process, of producing clay products such as building materials, pottery and other similar products that will be porous throughout and consequently light, but strong and water proof.

The invention comprehends not only the novel process but also the novel product, produced thereby.

With this and other objects in view the invention relates to a novel method, and product, an example of which will be hereinafter described and claimed.

In carrying out the process, clays having different fusing points are mixed, in any proportions desired. These clays should be thoroughly mixed and mingled together so that each will be thoroughly distributed throughout the other. They may be mixed dry and formed into the desired object to be produced in a dry press, or mixed wet and then moulded into the form of the desired articles to be produced. One of the clays should have a high fusing point, that is it should be of such nature that it will withstand great heat without melting, or charring; the other should have a lower melting, or charring point. The pressed, or moulded, objects should then be subjected to sufficient heat, in a kiln, to melt, or char the clay of the lower fusing point thus leaving pores, or small cavities, distributed throughout the article to be produced. The heat will, in many cases, cause the clay of the higher fusing point to vitrify or burn hard and will cause the fused clay to coalesce therewith thus forming a binder which makes the produced article of a firm and water proof texture.

The process has been described above by way of illustration only while the broad principle of the invention will be defined by the appended claims.

What I claim is:

1. The method of producing a clay product which consists in mixing two clays having high and low melting points respectively, and then subjecting the mixture to sufficient heat to fuse only one of said clays and maintaining the temperature to cause the fused clay to coalesce with the other clay.

2. The method of producing a clay product which consists of the following steps:— mixing together only two clays having different fusing points so that each clay will be distributed throughout the other, then forming the mixed clays into the shape of the desired product, then subjecting the object, so formed, to a sufficient temperature to fuse, or char, the clay having the lower melting point and to vitrify the clay of the higher melting point and causing said fused clay to coalesce with the other clay.

In testimony whereof I have signed my name to this specification.

PATTILLO HIGGINS.